(12) United States Patent
Yu et al.

(10) Patent No.: US 11,987,167 B2
(45) Date of Patent: May 21, 2024

(54) VEHICLE LIGHTING SYSTEM BASED ON INFRARED LIGHT SOURCES AND VEHICLES COMPRISING A MATRIX LAMP CONTROLLER

(71) Applicant: NIO TECHNOLOGY (ANHUI) CO., LTD, Hefei (CN)

(72) Inventors: Yongkun Yu, Hefei (CN); Rui Zhang, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 260 days.

(21) Appl. No.: 17/691,331

(22) Filed: Mar. 10, 2022

(65) Prior Publication Data

US 2022/0297592 A1    Sep. 22, 2022

(30) Foreign Application Priority Data

Mar. 19, 2021    (CN) .......................... 202110296119.8

(51) Int. Cl.
| | |
|---|---|
| *B60Q 1/04* | (2006.01) |
| *B60Q 1/00* | (2006.01) |
| *B60R 11/04* | (2006.01) |
| *G01S 13/06* | (2006.01) |

(52) U.S. Cl.
CPC ............ *B60Q 1/0023* (2013.01); *B60R 11/04* (2013.01); *G01S 13/06* (2013.01)

(58) Field of Classification Search
CPC ... B60Q 1/00; B60Q 1/02; B60Q 1/04; B60Q 1/14; B60R 11/04; G01S 13/06; G01S 13/50; G01S 13/86
USPC ...................................... 250/205, 214 R, 221
See application file for complete search history.

(56) References Cited

U.S. PATENT DOCUMENTS 11,262,041 B2 *    3/2022    Yamamura ........... G06V 20/584

FOREIGN PATENT DOCUMENTS

| JP | 2007-156832 | 6/2007 |
|---|---|---|
| JP | 2012-166652 | 9/2012 |
| JP | 2016-083987 | 5/2016 |
| WO | WO 2019/225349 | 11/2019 |

OTHER PUBLICATIONS

Extended Search Report for European Patent Application No. 22160650.2, dated Jul. 25, 2022, 7 pages.

* cited by examiner

*Primary Examiner* — Que Tan Le
(74) *Attorney, Agent, or Firm* — Sheridan Ross P.C.

(57) ABSTRACT

The invention relates to a vehicle lighting system based on infrared light sources, the vehicle lighting system comprising: an infrared matrix lamp, which comprises a plurality of infrared light sources arranged in a matrix and which is configured to be mounted on a vehicle to provide an illumination range with respect to the vehicle, wherein each of the plurality of infrared light sources corresponds to an illumination region in the illumination range; and a matrix lamp controller configured to turn on, when a target region needs to be illuminated, an infrared light source in the infrared matrix lamp corresponding to the target region on the basis of relative position information between the target region and the vehicle, wherein the relative position information comprises an angular position of the target region relative to a vehicle reference. The invention further relates to a vehicle comprising the vehicle lighting system.

9 Claims, 1 Drawing Sheet

VEHICLE LIGHTING SYSTEM BASED ON INFRARED LIGHT SOURCES AND VEHICLES COMPRISING A MATRIX LAMP CONTROLLER

CROSS-REFERENCE TO RELATED APPLICATION

This application claims the benefit of China Patent Application No. 202110296119.8 filed Mar. 19, 2021, the entire contents of which are incorporated herein by reference in its entirety.

TECHNICAL FIELD

The invention relates to the technical field of vehicles, and in particular to a vehicle lighting system based on infrared light sources and a vehicle comprising the same.

BACKGROUND ART

At present, since there is no ambient light or the ambient light is relatively dark during night driving, the visual recognition capability of a vision system such as a vehicle-mounted camera is relatively poor. This is a vulnerability or potential safety hazard for a vehicle with an autonomous driving capability. In order to avoid this problem, it is necessary for a lighting device of the vehicle to be capable of providing instant road lighting for the vision system. A conventional visible-light high beam system can provide this illumination range, but visible light may also cause glare to preceding or oncoming vehicles while performing illumination.

Therefore, there is a need in the art for a new vehicle lighting system to address at least one of the above-mentioned problems in the prior art.

SUMMARY OF THE INVENTION

In view of this, an embodiment of the invention provides a vehicle lighting system based on infrared light sources, for effectively solving or alleviating at least one of the disadvantages existing at present.

An aspect of embodiments of the invention relates to a vehicle lighting system based on infrared light sources, the vehicle lighting system comprising:

an infrared matrix lamp, which comprises a plurality of infrared light sources arranged in a matrix and which is configured to be mounted on a vehicle to provide an illumination range with respect to the vehicle, wherein each of the plurality of infrared light sources corresponds to an illumination region in the illumination range; and a matrix lamp controller configured to turn on, when a target region needs to be illuminated, an infrared light source in the infrared matrix lamp corresponding to the target region on the basis of relative position information between the target region and the vehicle, wherein the relative position information comprises an angular position of the target region relative to a vehicle reference.

In the vehicle lighting system according to an embodiment of the invention, optionally, the infrared matrix lamp further comprises a mounting plate for mounting the plurality of infrared light sources, a convex lens provided in front of the plurality of infrared light sources, and a front cover provided in front of the convex lens, such that infrared light emitted from the infrared light sources is transmittable through the convex lens and the front cover to illuminate the target region.

In the vehicle lighting system according to an embodiment of the invention, optionally, the infrared light source is an infrared light-emitting diode, and the mounting plate is a printed circuit board.

In the vehicle lighting system according to an embodiment of the invention, optionally, the infrared matrix lamp further comprises a base and a housing; the mounting plate, the convex lens and the housing are mounted to the base such that the mounting plate and the infrared light source thereon are located in an inner cavity of the housing; and the front cover is mounted at a front end of the housing.

In the vehicle lighting system according to an embodiment of the invention, optionally, the relative position information further comprises distance information of the target region relative to the vehicle, wherein the matrix lamp controller is further configured to adjust the brightness of the turned-on infrared light source on the basis of the distance information.

In the vehicle lighting system according to an embodiment of the invention, optionally, in the matrix lamp controller, there is a mapping between the relative position information and an infrared light source range in the infrared matrix lamp corresponding to the relative position information, and the matrix lamp controller turns on the infrared light source corresponding to the target region on the basis of the mapping.

Another aspect of embodiments of the invention relates to a vehicle, comprising a low beam system, a high beam system, a radar apparatus for sensing relative position information between the target region and the vehicle, and the vehicle lighting system according to any one of the preceding embodiments.

In the vehicle according to an embodiment of the invention, optionally, the vehicle further comprises a vehicle-mounted camera for recognizing an object within the target region when the infrared matrix lamp illuminates the target region.

In the vehicle according to an embodiment of the invention, optionally, the infrared matrix lamp is integrated in the low beam system or the high beam system of the vehicle.

BRIEF DESCRIPTION OF THE DRAWINGS

The invention will be further described in detail below in conjunction with the drawings and specific embodiments. However, those skilled in the art would appreciate that the drawings are drawn merely for the purpose of illustrating the specific embodiments and therefore should not be taken as limiting the scope of the invention. In addition, unless otherwise specified, the drawings are merely intended to be conceptually illustrative of the constitution or construction of the described objects and may include exaggerated representations, and the drawings are not necessarily drawn to scale. In addition, in different drawings, the same reference numerals denote the same or substantially the same components.

DETAILED DESCRIPTION OF EMBODIMENTS

Figure 1:
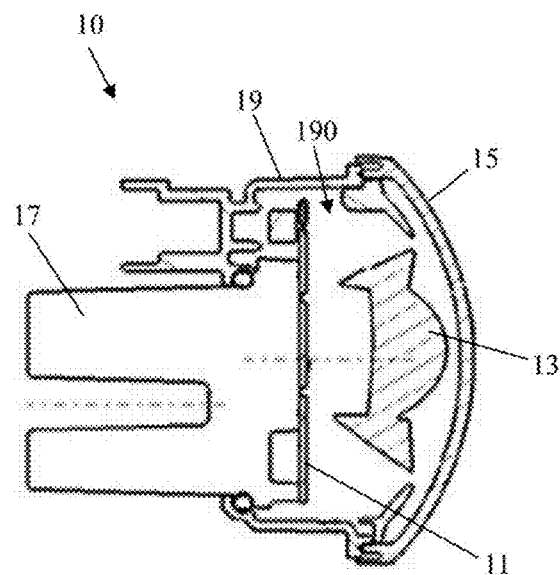
FIG. 1 shows a transmissive infrared matrix lamp for use in a vehicle-mounted lighting system according to an embodiment of the invention.

Some embodiments of the invention will be described in more detail below with reference to the drawings. Unless clearly defined otherwise herein, scientific and technical terms used herein have the meanings commonly understood by those skilled in the art.

Orientation terms such as "front" and "rear" referred to herein are defined with respect to the directions in the drawings the orientation terms are relative concepts and therefore may vary depending on their different locations and different practical positions. Therefore, these or other orientation terms should not be construed as limiting terms.

The use of "comprising" or "having" and variations thereof herein are meant to encompass the items listed thereafter and equivalents thereof as well as additional items. The term "or" and "alternatively" are not meant to be exclusive and refers to at least one of the referenced items being present and includes instances in which a combination of the referenced items may be present. Reference to "some embodiments", and so forth, here means that a particular element (e.g., feature, structure, and/or characteristic) described in connection with the invention is included in at least one embodiment described in the description, and may or may not be present in other embodiments. In addition, it should be understood that the inventive elements may be combined in any suitable way.

An aspect of the invention relates to a vehicle-mounted lighting system based on infrared light sources, which is used for providing illumination for a vision system of a vehicle and uses infrared light as light sources, avoiding the problem of light glare to other road users. The vehicle-mounted lighting system can instantly illuminate a region or an object needing to be illuminated for a vehicle-mounted camera according to the real-time demand of the vehicle-mounted camera.

An exemplary vehicle-mounted lighting system comprises an infrared matrix lamp, comprising a plurality of infrared light sources arranged in a matrix. The infrared matrix lamp is configured to be mounted on the vehicle to provide an illumination range relative to the vehicle. Each of the plurality of infrared light sources included by the infrared matrix lamp corresponds to an illumination region in the illumination range. The infrared matrix lamp is further configured to turn on, when a target region needs to be illuminated, an infrared light source in the infrared matrix lamp corresponding to the target region on the basis of the relative position information between the target region and the vehicle. The target region may comprise a region where an object needing to be detected in a vehicle driving path is located. For example, the target region may comprise a space occupied by the detected object. The relative position information between the target region and the vehicle may comprise an angular position of the target region relative to a vehicle reference. In some embodiments, the relative position information between the target region and the vehicle further comprises distance information of the target region relative to the vehicle, and the infrared matrix lamp may be further configured to adjust the brightness of the infrared light source corresponding to the target region on the basis of the distance information of the target region relative to the vehicle. The relative position information between the target region and the vehicle will be further described below in conjunction with a radar apparatus or the like of the vehicle.

In some embodiments, the vehicle-mounted lighting system may further comprise a matrix lamp controller for controlling the infrared matrix lamp. A mapping between the relative position information between the target region and the vehicle on the one hand and an infrared light source range in the infrared matrix lamp corresponding to the relative position information on the other hand may be stored in the matrix lamp controller, and the matrix lamp controller may turn on the infrared light source corresponding to the target region on the basis of the mapping. For example, this may be achieved in advance by means of calibration such that the angular position (or an angular range) of the target region detected by radar relative to the vehicle reference (e.g., a center line) can correspond to the angular range of the infrared light source range, which needs to be turned on in the infrared matrix lamp in order to illuminate the target region, relative to the infrared matrix lamp reference. Specifically, for example, when the radar detects that the angular position of the target region relative to the vehicle reference is ±5° in the longitudinal direction and ±3° in the transverse direction, the angular range of the infrared light source range needing to be turned on in the infrared matrix lamp relative to the infrared matrix lamp reference is also ±5° in the longitudinal direction and ±3° in the transverse direction (or in other corresponding relationships).

The matrix lamp controller is configured to turn on, when a target region needs to be illuminated, an infrared light source in the infrared matrix lamp corresponding to the target region, while keeping the remaining infrared light sources in the infrared matrix lamp off to save energy. The matrix lamp controller may be a separate controller or may be integrated into other controllers. The matrix lamp controller may be integrated in the infrared matrix lamp or may be provided outside the infrared matrix lamp. In some embodiments, the matrix lamp controller may comprise a matrix switch.

As shown in FIG. 1, an exemplary infrared matrix lamp 10 comprises an infrared light source mounting plate 11, a plurality of infrared light sources (not shown) arranged on the mounting plate 11, a convex lens 13 provided in front of the infrared light sources, and a front cover 15 provided in front of the convex lens 13. The front of the infrared light sources refers to the direction in which the infrared light sources faces an illuminated region. In some embodiments, the infrared light source is an infrared light-emitting diode (LED) and the infrared light source mounting plate 11 is an infrared LED printed circuit board. In some embodiments, the infrared matrix lamp 10 further comprises a base 17 and a housing 19. The infrared light source mounting plate 11, the convex lens 13 and the housing 19 are mounted on the base 17 such that the infrared light source mounting plate 11 and the infrared light sources thereon are located in an inner cavity 190 of the housing 19, and the front cover 15 is mounted at the front end of the housing 19, and covers the infrared light sources and the convex lens 13 from the front for providing protection. The infrared light emitted from the infrared light sources can be transmitted through the convex lens 13 and the front cover 15 to reach the target region for illumination.

Each infrared light source arranged on the mounting plate 11 may illuminate a corresponding illumination region, and the illumination regions of all the infrared light sources are combined together to form an overall illumination range.

Figure 2:
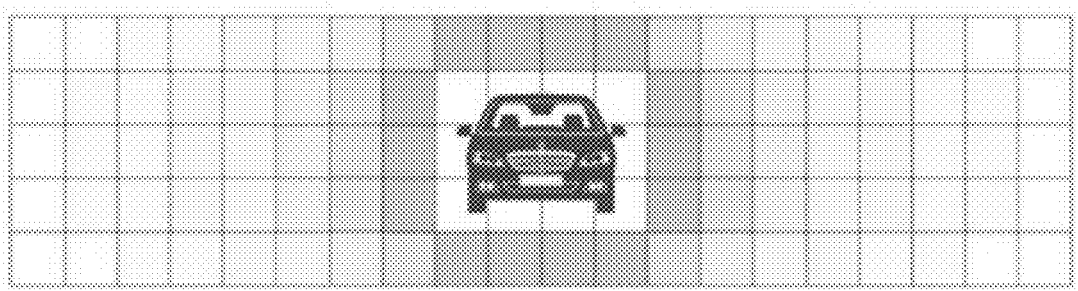
FIG. 2 shows a schematic diagram of matrix pixel unit distribution for an illumination area of the infrared matrix lamp shown in FIG. 1, with an oncoming vehicle appearing in the illumination area.
Figure 3:
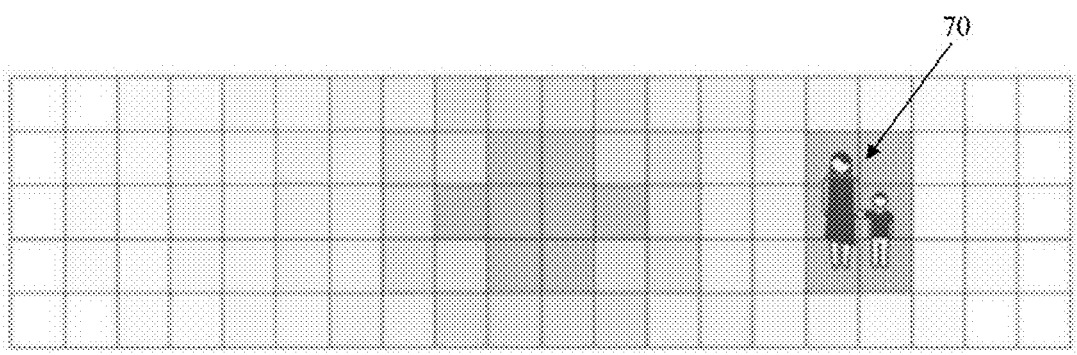
FIG. 3 shows a schematic diagram of matrix pixel unit distribution for an illumination area of the infrared matrix lamp shown in FIG. 1, with two pedestrians appearing in the illumination area.

For example, the combination of all the infrared light sources in the infrared matrix lamp 10 provides an illumination range of ±10° in the longitudinal direction and ±20° in the transverse direction with reference to the center line of the front of the vehicle. A predetermined illumination range may be achieved depending on the number and arrangement of infrared light sources in the infrared matrix lamp 10. In some embodiments, the infrared matrix lamp 10 may comprise 100 infrared light sources arranged in 5 rows and 20 columns to provide the predetermined illumination range. When the illumination range of the infrared matrix lamp 10 is projected onto a certain plane, a corresponding illumination area is formed, and the illumination area is composed of the illumination areas (pixel units or pixel points) projected by the illumination regions of the infrared light sources. For example, in some embodiments, as shown in FIG. 2 or 3, the 100 infrared light sources arranged in 5 rows and 20 columns in the infrared matrix lamp 10 have an illumination area in a certain plane that is composed of corresponding 100 pixel units in the 5 rows and 20 columns. Although the light source matrix of 5 rows and 20 columns is described above as an example, the embodiments of the invention actually have no limitation on the number of light sources and the arrangement of the matrix in the infrared matrix lamp 10. In a specific application, an appropriate number of infrared light sources may be selected according to the requirements of the vehicle-mounted vision system in consideration of cost and power consumption, to design a matrix system with any number of rows, columns and pixels and any illumination range.

The infrared matrix lamp 10 may be of a projection type, a reflection type or a direct irradiation type, and it may be independent of other lighting apparatuses of the vehicle, or may be combined or integrated with any vehicle external lighting apparatus. In some embodiments, the infrared matrix lamp 10 is a vehicle-mounted exterior lighting apparatus with its illumination effect independent of high and low beam functions of visible light. The infrared matrix lamp 10 can provide timely and sufficient road illumination for a vehicle vision system when needed. In addition, the power consumption of the system can be greatly reduced by controlling real-time turning off of the light sources in the infrared matrix lamp 10 that do not correspond to the target region, achieving energy saving and environmental protection.

The invention further relates to a vehicle, comprising a low beam system, a high beam system, a radar apparatus and the vehicle-mounted lighting system according to any one of the embodiments of the invention.

The radar apparatus may be configured to sense an object and determine its position when the object appears around the vehicle, such that the matrix lamp controller can determine, on the basis of information obtained by the radar apparatus, when to turn on which infrared light sources in the infrared matrix lamp 10. Specifically, the matrix lamp controller may sense an object on the basis of the radar apparatus and determine its position so as to turn on an infrared light source in the infrared matrix lamp 10 corresponding to a region (a target region) where the object is located. In some embodiments, the radar apparatus may acquire the relative position information between the target region and the vehicle, such as the angular position of the target region relative to the vehicle reference, and the distance information of the target region and the vehicle. The angle in the angular position may refer to an angle (e.g., an angular position of ±5° in the longitudinal direction and ±3° in the transverse direction) relative to the vehicle reference (e.g., the center line of the front of the vehicle). The distance information of the target region and the vehicle may comprise a distance range (e.g., a distance range of 2-3 meters) in which the entire target region is located relative to the vehicle reference. The radar apparatus may update the relative position information to a bus, such as a Controller Area Network, in real time at a frequency (such as 20 ms/frame), such that the matrix lamp controller can control the infrared matrix lamp 10 on the basis of the relative position information obtained from the bus.

The radar apparatus may be any radar apparatus that can sense an object appearing around the vehicle and determine its position. In some embodiments, the radar apparatus comprises a laser radar.

The radar apparatus may be beforehand calibrated with the infrared matrix lamp such that the angular position of the target region detected by the radar apparatus relative to the vehicle reference corresponds to the angular position of the infrared light source range capable of illuminating the target region relative to a reference point of the infrared matrix lamp (e.g., the center of the infrared matrix lamp). Therefore, the matrix lamp controller may determine, according to the angular position of the target region detected by the radar apparatus relative to the vehicle, that the infrared light source corresponding to the angular position of the reference point of the infrared matrix lamp is turned on.

In use, when the vehicle-mounted radar apparatus senses an object, it can be determined that it is necessary to illuminate a region where the object is located, and on the basis of the position of the object sensed by the vehicle-mounted radar apparatus relative to the vehicle, the matrix lamp controller can control the infrared matrix lamp to instantly turn on an infrared light source corresponding to the region (generally comprising a plurality of pixel units) where the object is located. When the vehicle-mounted vision system needs to illuminate a certain target region (such as the region where the vehicle is located as shown in FIG. 2 or the region where pedestrians are located as shown in FIG. 3), the corresponding information is transmitted to the matrix lamp controller, and the matrix lamp controller instantly turns on an infrared light source of the infrared matrix lamp corresponding to the target region so as to meet the illumination requirements of the vehicle-mounted vision system, while the remaining infrared light sources that do not correspond to the target region remain turned off to achieve the purpose of energy saving.

A case in actual use is described below with reference to the scenario in FIG. 3: When the vehicle-mounted radar apparatus finds that there is an object 70 outside the vehicle, it can obtain position information of the object 70, and the attribute recognition of the object 70 is completed by a vehicle-mounted camera, but the camera cannot recognize the object 70 without the aid of the illumination of the infrared matrix lamp. Therefore, when finding the object 70, the radar apparatus sends the corresponding information (including the position information of the object 70) to the matrix lamp controller, and the matrix lamp controller controls the infrared light source in the infrared matrix lamp corresponding to the region where the object 70 is located to instantly turn on to illuminate the corresponding object 70, for helping the camera to complete target recognition.

Furthermore, as previously mentioned, the infrared matrix lamp may be independent of other lighting apparatuses of the vehicle, or may be combined or integrated with any exterior lighting apparatus of the vehicle. In some embodiments, the arrangement of the infrared matrix lamp in the vehicle is independent of the low beam system and the high beam system. In some embodiments, the infrared matrix lamp is integrated in the low beam system or the high beam system of the vehicle.

The foregoing specific embodiments are provided for a more thorough and comprehensive understanding of the disclosure of the invention, but the invention is not limited to these specific embodiments. Those skilled in the art should understand that various modifications, equivalent replacements, changes and the like can also be made to the invention, and should be included in the scope of protection of the present invention as long as these changes do not depart from the spirit of the invention.

The invention claimed is:

1. A vehicle lighting system based on infrared light sources, the vehicle lighting system comprising:
   an infrared matrix lamp, which comprises a plurality of infrared light sources arranged in a matrix and which is configured to be mounted on a vehicle to provide an illumination range with respect to the vehicle, wherein each of the plurality of infrared light sources corresponds to an illumination region in the illumination range; and
   a matrix lamp controller configured to turn on, when a target region needs to be illuminated, an infrared light source in the infrared matrix lamp corresponding to the target region on the basis of relative position information between the target region and the vehicle, wherein the relative position information comprises an angular position of the target region relative to a vehicle reference.

2. The vehicle lighting system according to claim 1, wherein the infrared matrix lamp further comprises a mounting plate for mounting the plurality of infrared light sources, a convex lens provided in front of the plurality of infrared light sources, and a front cover provided in front of the convex lens, such that infrared light emitted from the infrared light sources is transmittable through the convex lens and the front cover to illuminate the target region.

3. The vehicle lighting system according to claim 2, wherein the infrared light source is an infrared light-emitting diode, and the mounting plate is a printed circuit board.

4. The vehicle lighting system according to claim 2, wherein the infrared matrix lamp further comprises a base and a housing; the mounting plate, the convex lens and the housing are mounted to the base such that the mounting plate and the infrared light source thereon are located in an inner cavity of the housing; and the front cover is mounted at a front end of the housing.

5. The vehicle lighting system according to claim 1, wherein the relative position information further comprises distance information of the target region relative to the vehicle, wherein the matrix lamp controller is further configured to adjust the brightness of the turned-on infrared light source on the basis of the distance information.

6. The vehicle lighting system according to claim 1, wherein in the matrix lamp controller, there is a mapping between the relative position information and an infrared light source range in the infrared matrix lamp corresponding to the relative position information, and the matrix lamp controller turns on the infrared light source corresponding to the target region on the basis of the mapping.

7. A vehicle, comprising a low beam system, a high beam system, a radar apparatus for sensing relative position information between the target region and the vehicle, and the vehicle lighting system according to claim 1.

8. The vehicle according to claim 7, further comprising a vehicle-mounted camera for recognizing an object within the target region when the infrared matrix lamp illuminates the target region.

9. The vehicle according to claim 8, wherein the infrared matrix lamp is integrated in the low beam system or the high beam system of the vehicle.

\* \* \* \* \*